United States Patent

Roos

[11] Patent Number: 4,716,325
[45] Date of Patent: Dec. 29, 1987

[54] DISENGAGEABLE ONE-WAY MECHANISM FOR SYNCHRONOUS MOTORS

[75] Inventor: William N. Roos, Colgate, Wis.

[73] Assignee: Autotrol Corporation, Milwaukee, Wis.

[21] Appl. No.: 927,573

[22] Filed: Nov. 6, 1986

[51] Int. Cl.[4] .............................................. H02K 7/10
[52] U.S. Cl. ......................................... 310/41; 192/7; 310/78; 335/35
[58] Field of Search .................. 188/82.3, 82.35, 82.4; 192/7, 8 R; 310/41, 78, 76, 83

[56] References Cited

U.S. PATENT DOCUMENTS

| | | | |
|---|---|---|---|
| 2,873,848 | 2/1959 | Steinmetz | 188/82.4 |
| 3,225,874 | 12/1965 | Woolley | |
| 3,309,635 | 3/1967 | Walker | 335/35 |
| 3,473,058 | 10/1969 | Landgraf et al. | 310/41 |
| 3,501,658 | 3/1970 | Morley | 310/41 |
| 3,747,033 | 7/1973 | Bennett | 335/35 |
| 3,795,075 | 3/1974 | Orzechowski | 188/82.3 |

Primary Examiner—Peter S. Wong
Assistant Examiner—D. L. Rebsch
Attorney, Agent, or Firm—Quarles & Brady

[57] ABSTRACT

A mechanism prevents the start-up of a synchronous a.c. motor in other than a desired direction. The mechanism includes a flexible arm having a finger that will engage a radially projecting abutment on the motor shaft. The finger blocks rotation of the shaft in a first direction and slides over the abutment when the shaft rotates in the opposite direction. A solenoid moves the arm and finger out of the path of the abutment shortly after the motor is energized, to allow the shaft to rotate in the first direction if the motor encounters an overload. Alternately, the arm may be formed of a bi-metal which is differentially heated by electrical current following motor energization to move the arm out of the path of the abutment.

5 Claims, 5 Drawing Figures

DISENGAGEABLE ONE-WAY MECHANISM FOR SYNCHRONOUS MOTORS

BACKGROUND OF THE INVENTION

This invention relates to improvements in small synchronous a.c. motors, and particularly to a mechanism that insures that such motors will alway begin rotation in the same direction, but which thereafter allows reverse rotation.

Small a.c. synchronous motors are often used as the prime mover for controlling the operation of valves and other mechanisms. The motors typically have a permanent magnet rotor and a circular array of poles of alternating polarity disposed about the rotor. Such motors when energized are likely to begin rotation in either a clockwise or a counterclockwise direction. If the motor is stalled by an overload on its shaft, the motor will then reverse rotation. Most control applications require that the motor always rotate in the same direction upon being energized, and rotation in either direction will not be acceptable. To insure single direction rotation upon start up, it has been typical to use a mechanical pawl mechanism that engages with gearing connected to the motor shaft to physically prevent the shaft from rotating in the unacceptable direction while allowing it to freely rotate in the acceptable direction. Examples of mechanisms that physically block rotation except in one direction are found in U.S. Pat. No. 3,225,874 issued Dec. 28, 1965 to Woolley for "Unidirectional Self Starting Device for Synchronous Motor; U.S. Pat. No. 3,473,058 issued Oct. 14, 1969 to Landgraf, et al. for "Self-Starting Synchronous Motor", and U.S. Pat. No. 3,501,658 issued Mar. 17, 1970 to Morley for "Bidirectional Motor with Directional Control Means for Starting in Either Direction".

Mechanisms that physically block rotation of the motor except in one direction do not allow the motor to reverse direction if it is stalled by an overload on the motor shaft because the reverse direction is always blocked.

My invention provides a mechanism for insuring that the motor will always begin its rotation in the same direction upon start up but the mechanism is disengaged shortly after start up so that the motor can reverse its direction when an overload condition is encountered.

SUMMARY OF THE INVENTION

The invention resides in a mechanism for use in association with the motor shaft of a synchronous a.c. motor. The motor shaft has a radially projecting abutment. A flexible arm has a finger that is normally positioned in the path of travel of the abutment to block rotation in one direction of rotation of the motor shaft while the arm, and its finger, will slide over the abutment when the motor shaft rotates in the opposite direction. Means responsive to the energization of the permanent magnet motor moves the arm and its finger out of the path of the abutment after the motor shaft has begun to rotate in such opposite direction.

In the preferred embodiments, the means for moving the arm with its finger comprise a solenoid whose coil is connected in parallel with that of the motor or a resistance heating element formed on one side of a bi-metal arm and connected in parallel with the motor. A time delay may be provided by a time delay switch in the first instance or by selecting the resistance in the heating element circuit.

It is a principal object of the invention to provide a simple mechanism to block rotation of a motor shaft in one direction so that the motor will always start to rotate in the same direction.

It is another object of the invention to provide such a mechanism that will become disengaged shortly after start up of the motor so that the motor can thereafter reverse itself if it encounters excessive torque load on the motor shaft.

The foregoing and other objects and advantages will appear in the detailed description which follows. In the detailed description, reference is made to the accompanying drawing which illustrates the preferred embodiments of the invention.

DETAILED DESCRIPTION OF THE PREFERRED EMBODIMENTS

Figure 1:
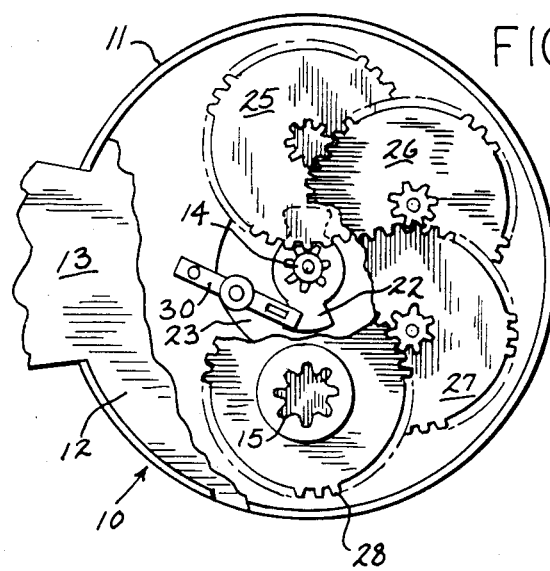
FIG. 1 is a top plan view of a synchronous a.c. motor, with parts broken away illustrating the motor shaft gearing and the one-way mechanism of the present invention.
Figure 2:
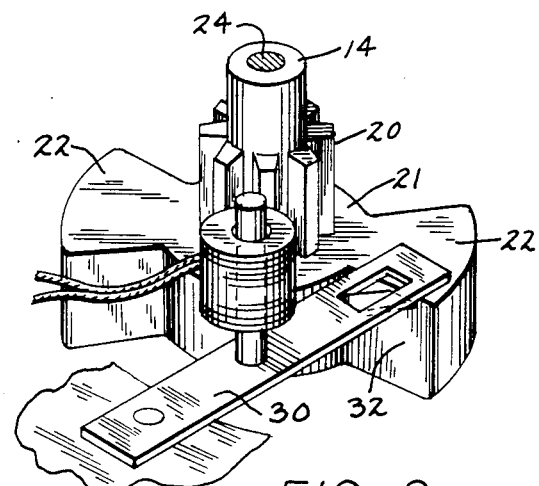
FIG. 2 is a view in perspective of a first embodiment of the one-way mechanism shown to an enlarged scale.
Figure 3:
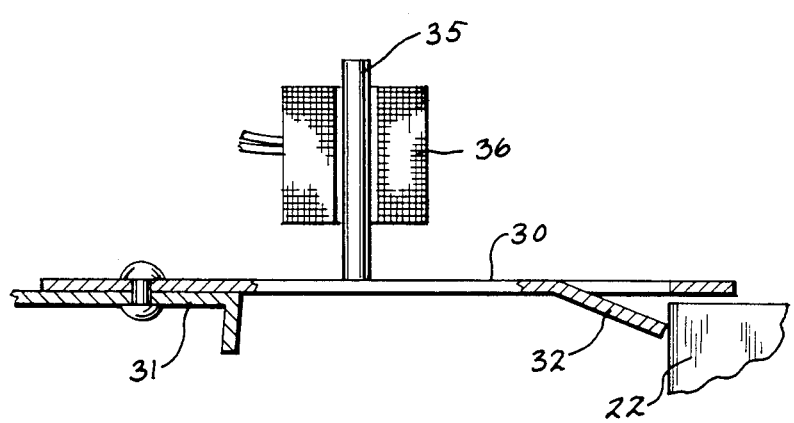
FIG. 3 is a side view of the one-way mechanism of FIG. 2 shown partly in section.

Referring to FIG. 1, a small synchronous a.c. control motor 10 is illustrated having a dish-shaped housing 11 with a cover plate 12 closing the open end of the housing 11 and providing one or more tabs 13 for mounting the motor to a support. The details of the motor construction are not relevant to the present invention except to note the presence of a motor shaft 14 disposed centrally of the motor, and a gear train which connects the output shaft 14 to a drive pinion 15 that projects through an opening in the cover 12. The motor may be any of a variety of available synchronous motors such as, for example, model 414-340-20 manufactured and sold by the Singer Controls Division. Such motors operate on a.c. current and the speed reduction gearing can be selected to provide a desired output speed for the driven pinion 15, such as one rpm.

The motor shaft 14 has an integral pinion 20 which is also formed integral with a base portion 21 that includes two laterally projecting ears that form abutments 22. The motor shaft 14 is attached to a permanent magnet rotor 23 of the motor 10 by having the base portion 21 cemented to a face of the rotor 23. The output shaft 14 with the pinion 20 and base portion 21 are mounted to rotate with the rotor 23 about a stationary rod 24. The gear train includes three combination gears and pinions 25, 26 and 27 each mounted to rotate on a respective stationary rod. The pinion of the gear and pinion 27 engages a gear 28 that is formed integral with the output pinion 15.

When a motor of this type is energized, it can start to rotate in either direction of rotation. There are instances of use for such motors in which rotation in either direction is an undesirable result. One such use is as the motor to drive a pellet dropping device such as that illustrated and described in the co-pending application Ser. No. 656,176, filed Sept. 28, 1984, now U.S. Pat. No. 4,662,538, for "Chlorine Tablet Dispenser" and assigned to the assignee of this application. The dispenser of such copending application has a very predictable rate at which it will dispense chlorine or other chemical tablets, but only if the motor always rotates in one direction. The dispenser may, however, experience difficulties in dispensing a tablet which can be caught between rotating and stationary surfaces. If that happens, the dispenser will jam and the motor will stall. Ideally, under such a circumstance, the motor will reverse itself to clear the jam and permit the dispenser to continue to function without the necessity of human intervention to clear the jam. The mechanism of this invention is designed to insure that the motor will always begin rotation in the same direction upon energization but will be capable of reversing itself should it stall, as by encountering a jam.

A flexible arm 30 is riveted or otherwise attached at one end to a casing 31 surrounding the stator windings of the motor 10. The arm 30 is cantilevered from its attachment to the casing 31 and it includes a depending finger 32 which is placed in the path of travel of the abutments 22 on the base portion 21 when the flexible arm 30 is in its normal, relaxed condition. In the first embodiment, the arm 30 mounts an upright pole piece 35 which is surrounded by an a.c. solenoid coil 36.

Figure 4:
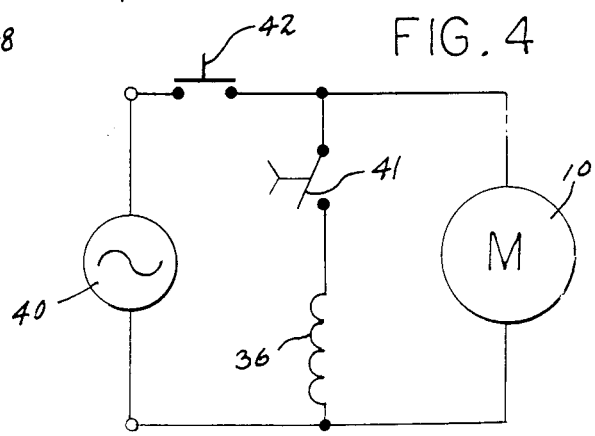
FIG. 4 is a schematic circuit diagram showing how the mechanism is electrically associated with the motor.

Referring to FIG. 4, the coil 36 of the solenoid is connected in parallel with the motor 10 across a source of a.c. current 40. The solenoid coil 36 is also connected in series with a time delay switch 41, such as in a time delay relay. When an on/off switch 42 is closed to energize the motor 10, the coil 36 will be energized after a suitable time delay, as established by the time delay switch 41. When the motor 10 is energized, if the rotor 23 seeks to rotate in a counterclockwise direction as viewed in FIG. 1, the flexible arm 30 will ride over the abutments 22 and not interfere with the rotation. If, however, the rotor 23 should seek to rotate in a clockwise direction as viewed in FIG. 1, the rotation will be blocked by the engagement of the finger with an abutment 22. The resulting stall on the motor will immediately cause the motor to reverse direction, moving in the desired counterclockwise direction.

After the motor has commenced to rotate in the desired direction, the arm 30 is effectively removed from operating engagement by the pole piece 35 being lifted by the coil 36 to thereby remove the finger 32 from the path of travel of an abutment 22. As a result, should the motor stall after it has started to rotate in the desired direction, the rotor 23 can reverse its direction of rotation without encountering the finger 32.

Figure 5:
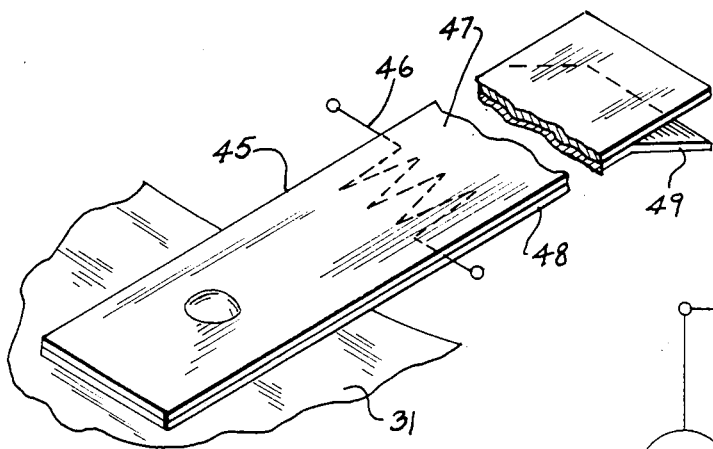
FIG. 5 is a view in perspective of a second embodiment of the mechanism.

In the embodiment of FIG. 5, the flexible arm 45 takes the form of a bi-metal element having a heater resistance element 46 mounted to the lower one of its bi-metal layers 47 and 48. The element 46 would be connected in parallel with the motor 10. Upon energization of the motor 10 by closing the switch 42, the resistance element 46 would also be energized, to thereby warm the lower layer 48 and cause the arm 45 to deflect upwardly to remove a finger portion 49 from the path of travel of the abutment 22. There is an inherent time delay in the operation of the second embodiment and the amount of time delay can be controlled by selecting the resistance in the element 46 or by adding additional resistance in series with the element 46.

Other forms of means for moving the arm after rotation begins in the desired direction will be apparent to those skilled in the art.

I claim:

1. In combination with a bidirectional a.c. synchronous motor having a casing and a motor shaft disposed in an opening in the casing, a disengageable one-way mechanism comprising:

an abutment mounted to the motor shaft for rotation therewith;

a flexible arm mounted to the casing and including a finger normally disposed in the path of said abutment and adapted to block said abutment when the motor shaft rotates in one direction and to ride over said abutment when the motor shaft rotates in the opposite direction; and means responsive to the energization of said motor and including a time delay to move said arm to remove the finger from the path of the abutment after the motor shaft has begun to rotate in said opposite direction and for as long as the motor is energized.

2. A mechanism in accordance with claim 1 wherein said means comprises a solenoid coil disposed about a pole piece attached to the arm, said solenoid coil being connected with the motor across an a.c. source, and a time delay switch connected in series with the solenoid coil.

3. A mechanism in accordance with claim 1 wherein said arm is bi-metallic and said means comprises a resistance heating element mounted against one of the surfaces of the arm to cause the arm to deflect after the element has been energized.

4. A mechanism in accordance with claim 1 wherein said finger extends at a small angle from the arm.

5. A disengageable one-way mechanism for a bidirectional a.c. synchronous motor having a casing and a motor shaft disposed in an opening in the casing, said mechanism comprising:

an abutment adapted to be mounted to the motor shaft for rotation therewith;

a flexible arm adapted to be mounted to the casing and including a finger normally disposed in the path of said abutment and adapted to block said abutment when the motor shaft rotates in one direction and to ride over said abutment when the motor shaft rotates in the opposite direction; and means responsive to the energization of said motor and including a time delay to move said arm to remove the finger from the path of the abutment after the motor shaft has begun to rotate in said opposite direction and for as long as the motor is energized.

* * * * *